Figure 1:
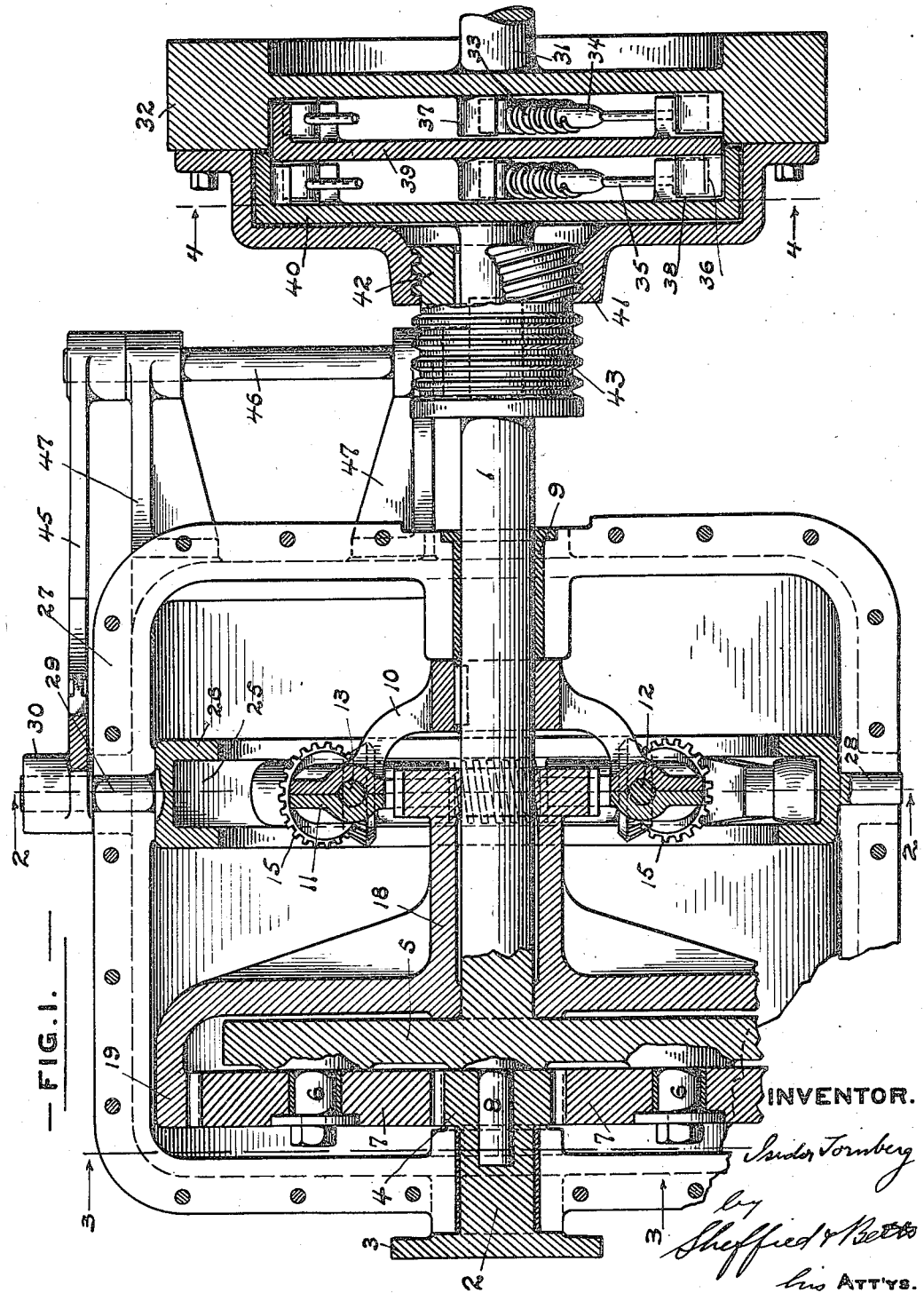

I. TORNBERG.
TRANSMISSION MECHANISM.
APPLICATION FILED JUNE 5, 1917.

1,282,495.

Patented Oct. 22, 1918.
5 SHEETS—SHEET 1.

INVENTOR.
Isidor Tornberg
by
Sheffied & Betts
his ATT'YS.

I. TORNBERG.
TRANSMISSION MECHANISM.
APPLICATION FILED JUNE 5, 1917.
1,282,495.
Patented Oct. 22, 1918.
5 SHEETS—SHEET 2.
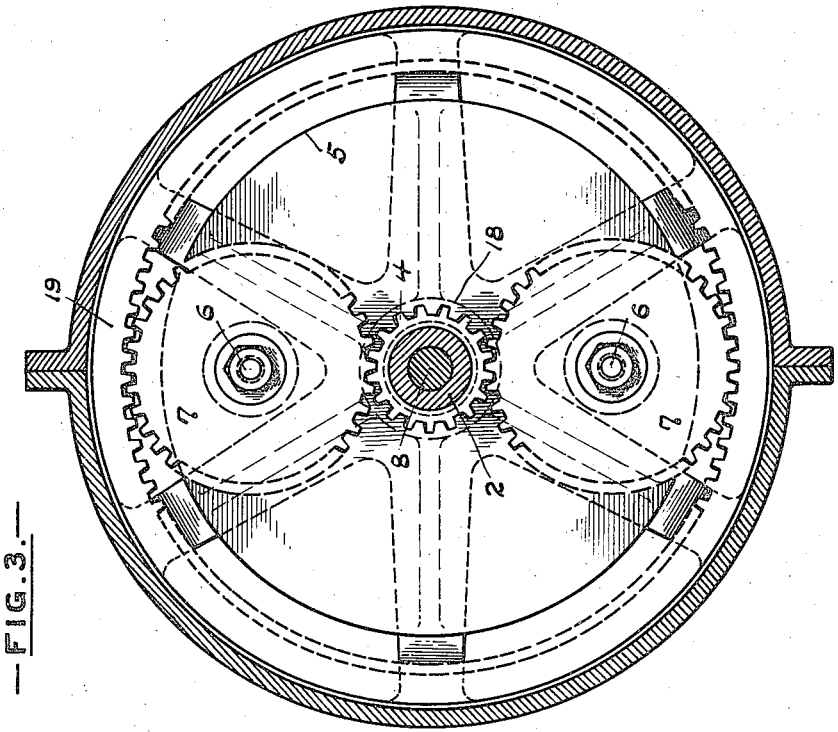
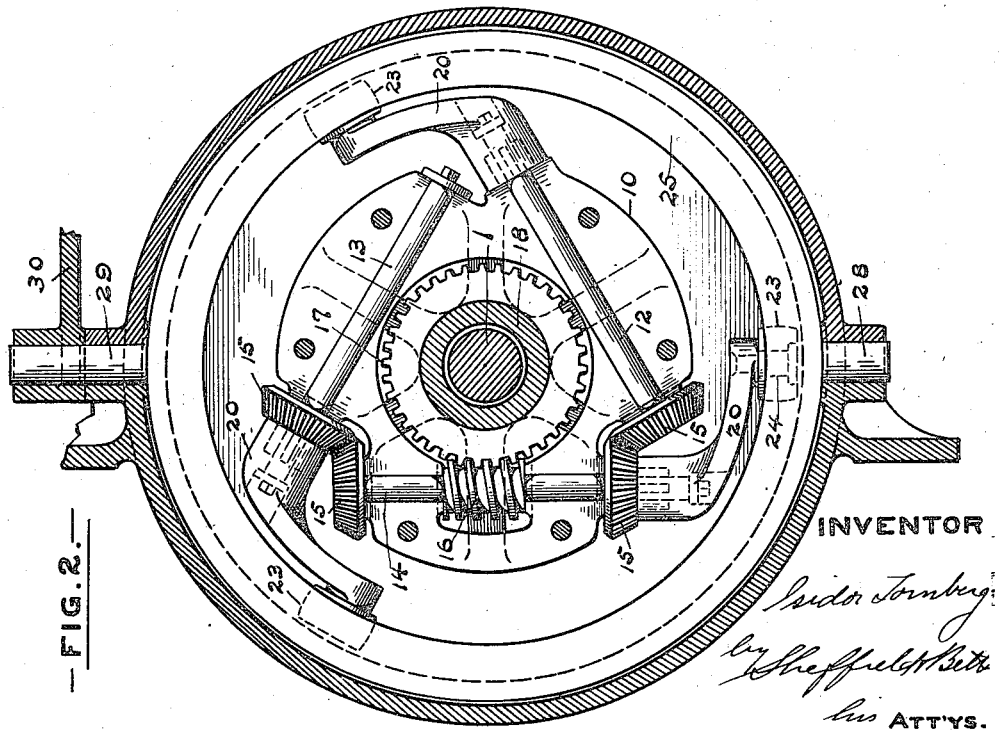
INVENTOR
Isidor Tornberg
his ATT'YS.

I. TORNBERG.
TRANSMISSION MECHANISM.
APPLICATION FILED JUNE 5, 1917.
1,282,495.
Patented Oct. 22, 1918.
5 SHEETS—SHEET 3.
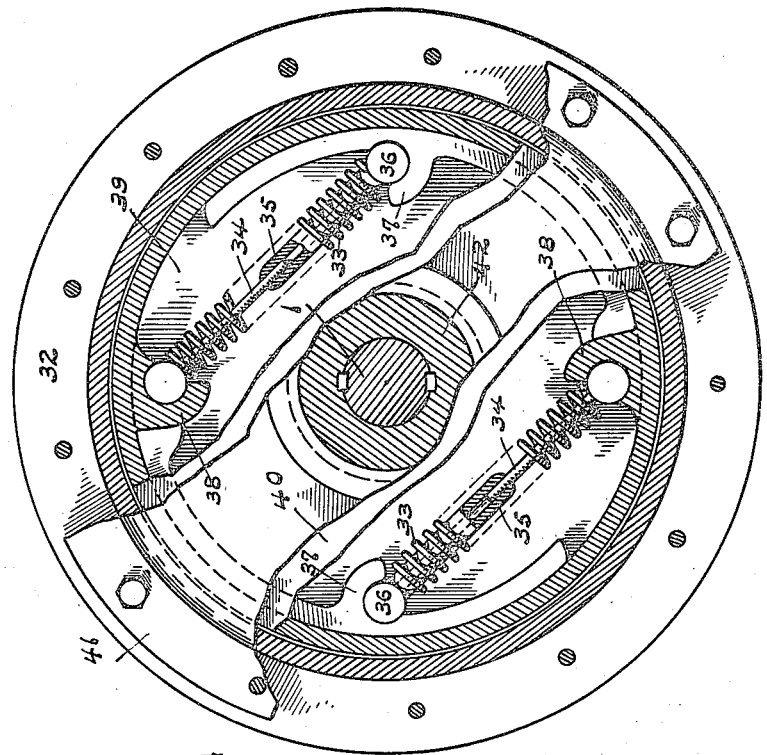
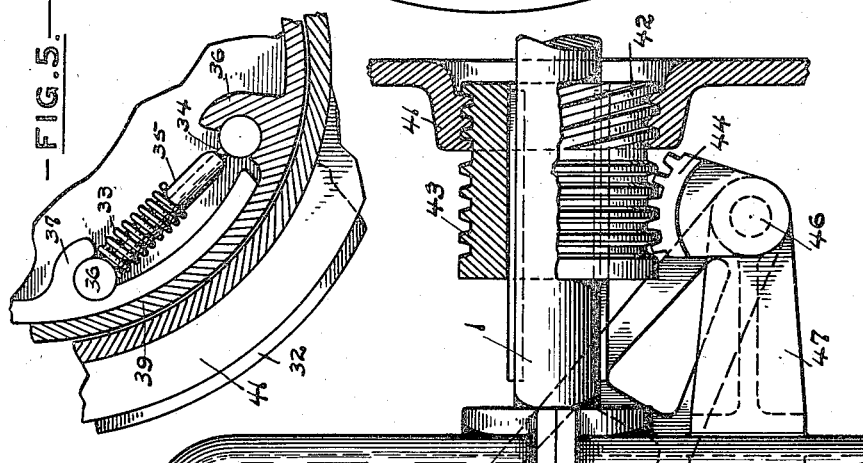
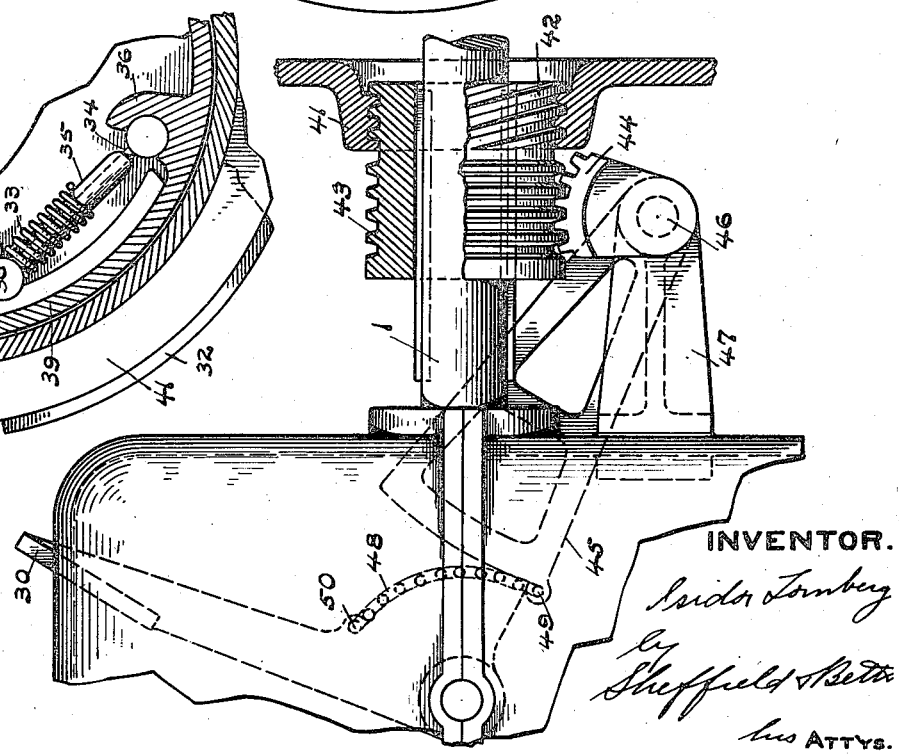
INVENTOR.
Isidor Tornberg
by
Sheffield & Betts
his ATTYS.

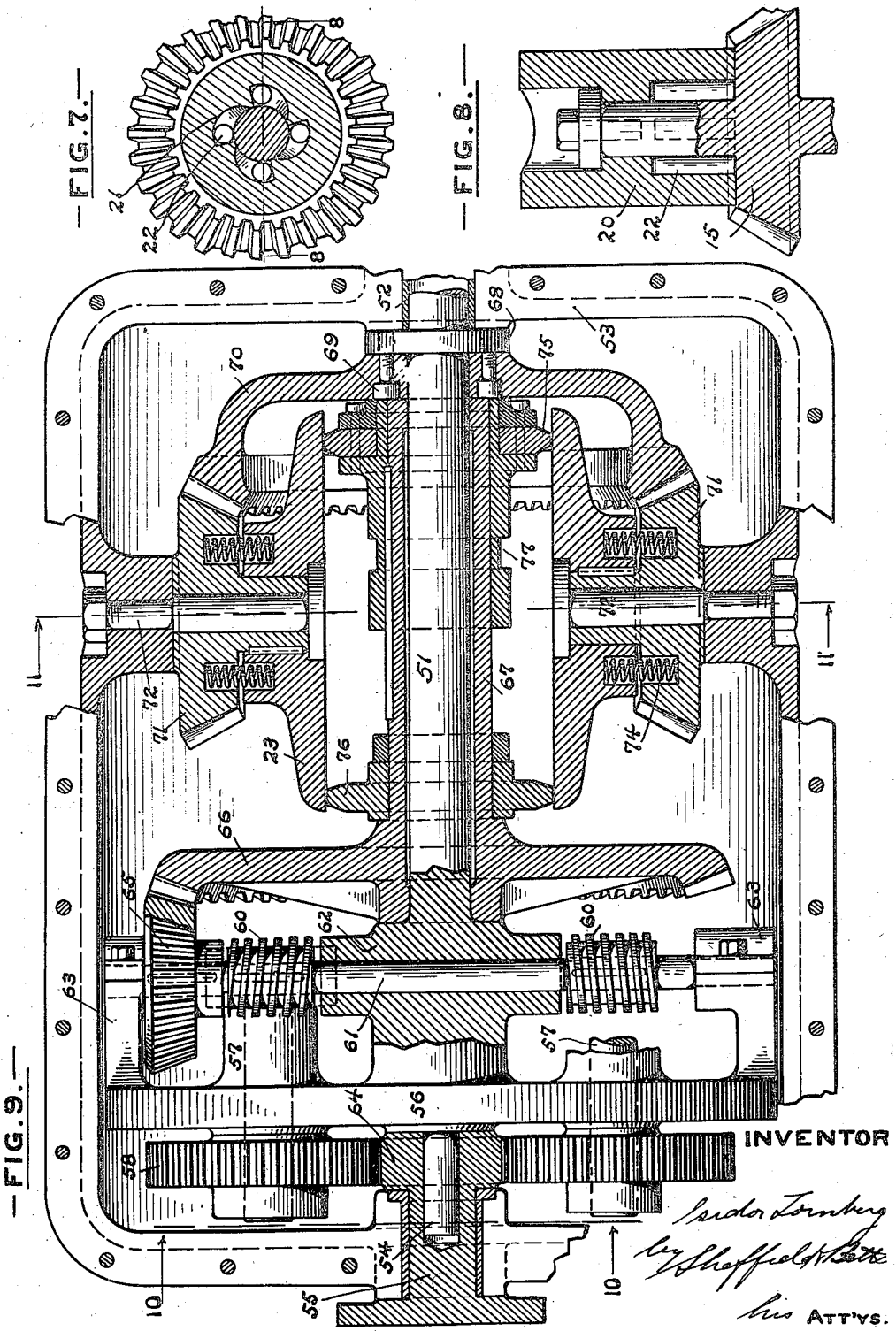

I. TORNBERG.
TRANSMISSION MECHANISM.
APPLICATION FILED JUNE 5, 1917.

1,282,495.

Patented Oct. 22, 1918.
5 SHEETS—SHEET 5.

INVENTOR.
Isidor Tornberg
Sheffield & Betts
his ATT'YS.

UNITED STATES PATENT OFFICE.

ISIDOR TORNBERG, OF BROOKLYN, NEW YORK.

TRANSMISSION MECHANISM.

1,282,495.  Specification of Letters Patent.  Patented Oct. 22, 1918.

Application filed June 5, 1917. Serial No. 172,850.

*To all whom it may concern:*

Be it known that I, ISIDOR TORNBERG, a citizen of the United States of America, and a resident of the borough of Brooklyn, county of Kings, and State of New York, have invented certain new and useful Improvements in Transmission Mechanisms, of which the following is a description.

This invention relates to certain improvements in variable speed power transmission devices used in connection with any mechanism where a continuous uninterrupted transmission of power is desired at varying speed, and where the variation in speed is accomplished gradually without shock and without an accompanying momentary cessation of power delivery. It is therefore specially applicable to the needs of automobiles and similar uses.

The especial object of my invention is to provide a mechanism which will transmit power in either direction relatively to the direction of rotation of the driving member at varying speeds with corresponding inversely varying torques. Thus, as the speed is decreased from the full speed forward the torque is correspondingly increased with a maximum torque available at the standstill. This distinguishes this mechanism from others in which the speed of the driven member is reduced by slipping or "by-passing" some of the torque, thereby lessening the effective power that can be transmitted at the lower speed.

Another object of this invention is to provide a direct transmission of power throughout the entire range of speeds forward. This is to distinguish it from those inventions of like character, wherein the power is transmitted through successive impulses given the driven member through a series of oscillating members and ratchets or clutches whereby the machine is virtually ratcheted forward, and wherein the change in speed is obtained by a change in the extent of oscillations produced by the driving member. In such other devices the impulses or oscillations are greatest during the higher speeds and are lessened where lower speeds are desired. This results in the mechanism being used under the greatest stresses during the time when the hardest work is demanded of it, that is where a high ratio between the driving and driven members is desired.

Another object of this invention is to keep the driven member under the control of the driving member during all conditions of rotation, either forward or rearward and when at a standstill. This results in the car being slowed down positively as the speed control is manipulated preparatory to a stop and when fully brought to a stop the relative positions of the various elements are such as to hold the wheel from being rotated by outside efforts, thereby producing a braking effect.

Another object of this invention is to produce a simple, efficient and relatively inexpensive transmission for an automobile as it removes the necessity for the existing gear-shifting speed-change box, and service brake, and it centralizes the control of the vehicle in a single foot-pedal or its equivalent by which a full or intermediate forward motion, brake stop and rearward motion are effected pregressively in the order mentioned.

Another object of this invention is to produce an automatic control of the speed of the automobile or other machine, in addition to the manual control, by which a sudden change in the load transmitted such as varying road conditions will cause the mechanism to readjust itself to a lower speed so that the excessive work will be transmitted without damage to the machine.

These and other objects will appear to those versed in the art in the following description in connection with the drawings and claims appended.

Figure 1—represents a longitudinal section of the preferred construction of the mechanism in question with one half of the casing removed.

Fig. 2—shows a cross section of the mechanism taken on line 2, 2, on Fig. 1.

Fig. 3—is a cross section of the driving members of the mechanism taken on line 3, 3, of Fig. 1.

Fig. 4—is a partial section, being taken on line 4, 4, of Fig. 1.

Fig. 5—is a fragmentary section of the speed controlling member, showing it in the position which its part will occupy when a heavy load is being transmitted.

Fig. 6—is a side elevation of the speed control actuating device.

Fig. 7—is a section on line 7, 7, of Fig. 1 being a section of the clutch mechanism.

Fig. 8—is a section taken on line 8, 8, of Fig. 7.

Fig. 9—is a longitudinal section of a mechanism of somewhat different construction which accomplishes the same results as that shown in Fig. 1.

Figure 10:
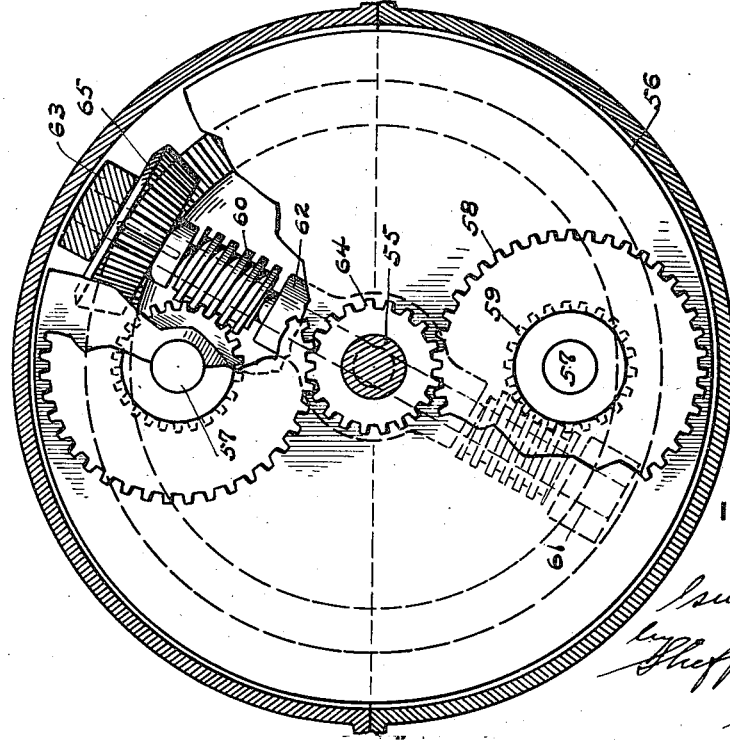

Fig. 10—is a cross section taken on line 10, 10, of Fig. 9.

Figure 11:
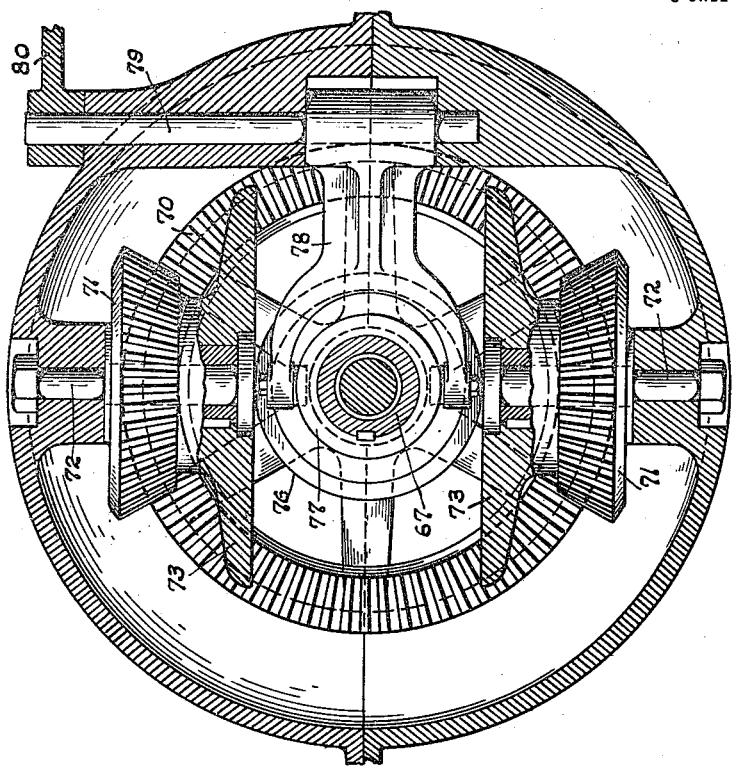

Fig. 11—is a cross section taken on line 11, 11, of Fig. 9.

Throughout the specifications and the different views of the drawings similar characters indicate corresponding parts.

Broadly speaking the transmission mechanism which forms the subject of this specification comprises two main elements, the "primary," or constant speed element and the "secondary," or variable speed element. In the following specifications these will be referred to as the primary and secondary elements. The action of the mechanism in a general sense consists of the proper utilization of the two transmission elements and so applying them to the driven member that the latter may perform the functions above referred to.

Referring now to Figs. 1, 2 and 3: 1 represents the primary transmission element which is actuated by the driving member, in this case the engine shaft 31. The numeral 2 represents the driven element which drives the machine, such as, for instance, the rear wheels of an automobile, and is here shown provided with a flange 3.

The driven shaft 2 is formed at its inner end with a pinion 4 by which it is driven. The transmission shaft 1 is made integral with a face plate 5 from which two studs 6 project. Upon these studs there are rotatably mounted the intermediate gears 7 meshing with pinion 4 of the driven shaft 2. The gears 7 are therefore rotatable about the studs 6, and revoluble about the axis of shaft 1.

The face plate 5 has a projection 8, bearing in a hole bored in the driving shaft 2 for supporting that end of the shaft 1, the other end being supported in one of the bearings of box 9. Fastened to the inner end of the driving shaft is a spider 10 shown more fully in Fig. 2. The spider 10 has journaled in proper bearings formed by its inner face and cap 11, three short shafts 12, 13 and 14, which are free to rotate, but restrained against longitudinal motion. Shafts 12, 13 and 14 are rotatably connected to one another by means of bevel gears 15. Shaft 14 is formed integrally in its center portion with a worm 16 meshing with worm wheel 17, said worm wheel being a part of sleeve 18, which is formed at its opposite ends with an internal gear 19. Sleeve 18 is mounted upon shaft 1 and is free to be rotated thereon through the worm wheel 17 by worm 16 which in turn is rotated as hereinafter described.

Levers or crank arms 20 are centered on shafts 12, 13 and 14 and are formed at their inner ends with grooves 21 as shown in Figs. 7 and 8. In these grooves a number of rollers 22 are disposed which, together with the grooves in the levers, form what is termed a silent clutch or ratchet, the function of which is to rotate the shaft when the lever is moved in one direction and to remain inoperative when the movement of the lever is reversed. Thus by oscillating the levers 20 progressively a forward motion is imparted to shafts 12, 13 and 14 when their respective levers are moved in the direction favorable to the clutching of the silent ratchets. Any other suitable form of unidirectional clutch may, of course, be substituted for that illustrated. Shafts 12 and 13 transmit progressive forward motion through gears 15 to the shaft 14, in addition to the motion given shaft 14 by the lever thereon.

The oscillation of the levers 20 is produced by the rollers or followers 23 mounted on studs 24, which are fastened to the ends of the levers. These rollers ride in a groove or guideway 25 formed in a ring 26 mounted within the casing 27 on two pivots 28 and 29. Pivot 29 extends through the casing and has mounted thereon a foot-pedal 30 by which ring 26 may be tilted as desired.

It will therefore be seen that when shaft 1 is revolved by the motor it carries with it spider 10 which together with cap 11 causes shafts 12, 13 and 14 with all the parts mounted thereon to revolve bodily about shaft 1. When the ring 26 is in the position shown in the drawing, it is evident that no oscillation is imparted to levers 20 and shafts 12, 13 and 14. However, by tilting the ring 26 through the foot-pedal 30 to any desired angularity, each of the levers 20 will progressively oscillate a distance equal to the degree of tilt, these oscillations producing rotation of worm 16 cause worm wheel 17, sleeve 18 and internal gear 19 to revolve about shaft 1 a distance in proportion to the amount of angular tilt of the ring 26. The internal gear wheel 19 together with the mechanism for revolving it, as heretofore described, constitutes the secondary driving member.

Briefly speaking the operation of the mechanism is as follows:

The primary transmission member 1 is rotated by the motor at the speed of the motor, which for the purpose of example will be assumed to be constant. The primary member carries with it the intermediate gears 7 mounted on studs 6 which are a part of face plate 5 together with shafts 1, spider 10 and all its correlating parts as shown in Fig. 2. Assuming that ring 26 is in the position shown in the drawing, the internal gear 19 is likewise rotated at the same speed as the primary driving member 1.

It will therefore be seen that since the internal gear 19 and face plate 5 rotate in the same direction at the same speed, the intermediate gears 7 cannot rotate about their own axis, but are locked in whatever position they may be in and consequently rotate the driven member 2 through its pinion 4. In other words, the primary and secondary transmission members are rotated at precisely the same speed as the driving member, the driven member likewise being rotated at the same speed. The full torque is being thus transmitted and the mechanism is said to be running at high speed.

In the case of automobiles this high speed position is the one the driving and driven members are kept at during most of the time the mechanism is in use, this being commonly called the direct drive, inasmuch as the driving and driven members are directly coupled together and are not driven through intermediate gear. It will be noted that when in this position no oscillations or any other work except straight rotating effort is applied to the parts and this makes it especially desirable for automobile transmissions, since automobiles are driven in direct drive 95% of the time.

When a lower speed is desired the foot pedal 30 is depressed which in turn tilts the ring 26 to any desired degree. The primary member continues revolving at a constant forward speed and the levers 20 of the secondary driving member being carried around the center of shaft 1 are oscillated by the angular displacement of ring 26 and rotate worm 16 and in turn worm wheel 17 through a constant angular distance for every revolution of the primary driving member. The extent of angular rotation on the part of worm wheel 17 and internal gear 19 depends upon the angular displacement of ring 26.

When the ring 26 is angularly displaced the internal gear 19 is rotated through more than a complete revolution and driven pinion 4 and driven shaft 2 are rotated through less than a complete revolution during one complete revolution of the primary transmission element 1. The extent of the retardation of the driven element depends upon the extent of the acceleration of internal gear 19. Hence, it will be seen that by tilting the ring 26 more or less, a slower or faster speed on the part of the driven member will be had. Attention is called to the fact that in order to produce slower rotation on the part of the driven member 4 the internal gear 19 must be rotated through a greater angular distance while the primary transmission member in all cases is being rotated at its customary speed. From this it becomes evident that the original torque is transmitted by the primary transmission member while additional torque is transmitted by the secondary transmission member. Therefore when the driven member is rotated at slower or intermediate speed the mechanism will transmit power at a higher torque than it will when the driven member is rotated at high speed.

This is most important in transmission mechanism of all sorts, since the high torque is essential at slower speed. The product of speed and torque must remain constant. This is not the case with the mechanism which varies the speed of the driven member by slipping or "by-passing" some of the power.

When the ring 26 is tilted far enough to cause the ring 19 to rotate through a sufficiently large angular distance, it is conceivable that the driven member will remain stationary. When in this position, however, the primary transmission member continues to revolve at the constant speed while the secondary transmission member is revolved at a somewhat higher speed, the combination of the two speeds acting to restrain the driven member from rotating or being rotated by outside influence. The effect produced by this is the same as applying a brake to the driven member but is much more effective than that, because since the application of the retarding force is not produced suddenly, but is gradually applied as the speed of the driven shaft is lessened, the slowing down and stopping is therefore produced positively, and without slip.

It is conceivable that should the ring 26 be tilted farther and internal gear 19 be rotated through a still greater angular distance a reverse movement of the driven member will be effected.

It therefore appears clearly that while the driving member is rotating at a constant speed and delivers constant power, the driven member may be (1) driven at the same speed and transmit the same power, or, (2) may be driven at any intermediate slower speed transmitting power at much higher torque, or, (3) may be entirely kept from rotating, or, (4) may be rotated in the rearward or reversed direction, by merely tilting ring 26 to a position consistent with the desired effect on the driven member.

It will be well to remember that since the stop and reverse as well as the slow speed are used very seldom in driving an automobile compared to the full forward speed, the life and efficiency of this transmission is high since no extra work or oscillation is needed to produce the direct forward rotation of the driven member other than rotating the driving member at its constant speed.

When an automobile is running along level ground at a certain speed at which it is driven by the engine at the full forward speed of the transmission, a certain amount of power is developed by the engine which is just enough to drive the automobile at that speed. Assuming that an up grade of roadway is met or that the road becomes rough and harder to pass over, a good deal more power is needed to drive the car than on level smooth roads. When such difficulty is met it usually results in the slowing down of the engine under the increased load and therefore developing less power than it did when running at full speed. It is therefore advisable when such conditions are met, to change the ratio between the driving and driven members so that a higher torque may be transmitted to the driven element. Although this is possible through manually depressing the foot-pedal 30, it is advisable to have this change of ratio accomplished automatically and to have it governed entirely by the extent of the change in the load transmitted.

To accomplish this the mechanism is driven from the engine shaft 31, see Fig. 1, and fly wheel 32, through a series of springs 33 which are disposed around collapsible spring rods 34 and 35 which are formed at their extreme ends with projections 36. One of these projections is centered in the lug formed within the fly wheel 37 and the other end is centered in lug 38, formed in disk 39. There may be one or more sets of these springs, two sets being illustrated in the drawing herewith. Disk 39 has on its opposite face a lug similar to 37, while the face plate 40 which is a part of the driving shaft 1 of the mechanism, has lugs similar to 38 formed in its inner face. Springs and spring rods are disposed between these lugs and actuated in precisely the same way.

It must be understood that disk 39 may be left out entirely and the spring action be disposed entirely between fly wheel 32 and face plate 40. The extra disk and springs are shown so as to supply extra spring tension and a greater flexibility for the mechanism. It will be evident by reference to Fig. 4 that spring rods 34 and 35 are disposed so that their respective projection 36 may be extended by the springs or be compressed by external force. Fig. 4 shows a partial cross section through the mechanism and it is understood that the other section is merely a duplicate of that shown.

The fly wheel 32 has bolted to it nut 41, which has an internal thread cut in its smaller bore and engages with a corresponding thread cut on sliding sleeve 42. Sleeve 42 is slidably mounted on shaft 1, but is constrained to rotate therewith by means of sliding feathers. The other half of sleeve 42 has circular rack teeth 43 cut on its periphery. The power as transmitted from the engine to the mechanism passes from fly wheel 32 and lugs 37 through springs 33 to lugs 38, then from disk 39 through the second set of springs to face plate 40, and thence the driving shaft of the mechanism. When the normal load is being transmitted, the springs which are in an extended position and the fly wheel 32, together with nut 41, form a certain fixed relation with face plate 40, driving shaft 1 and sleeve 42. Should a greater load be applied by the engine, or should the engine meet a greater resistance the springs will compress an amount equivalent to the extra load applied. A change of relation will take place between nut 41 and parts connected with it, and sleeve 42. Such readjustment of the parts causes sleeve 42 to move longitudinally along shaft 1 by virtue of the threads cut thereon. This action (referring now to Fig. 6) causes segment 44 to oscillate forward and carry with it segment 45, both of these segments being fastened to shaft 46 journaled in brackets 47. The forward motion of segment 45 causes pedal 30 to be depressed through the flexible chain connection 48 which is fastened to segment at 49 and to pedal 30 at 50. This will cause a change of ratio between driving and driven members of the mechanism as explained above so that the latter will be driven at a slower speed to compensate for the greater torque which is being transmitted. As will be seen, this action is entirely automatic and is independent of the manual control through pedal 30. Fig. 5 shows a spring compressed into the form it will take when a greater load is being transmitted. Notice will be taken that when in this position a center line drawn through the spring rod will be farther away from the center of the driving shaft, than when in the position shown in Fig. 4. This action is peculiar to the particular construction shown herewith and is intended to supplement the flexibility of the spring and make the entire mechanism more sensitive to load variations.

Fig. 9 shows a cross section of another embodiment of the same invention which likewise consists of a double transmission element and a driven element.

Shaft 51 is the main driving shaft journaled at one end in bearing 52 of the casing 53, and at the other end in bearing 54 within the driven shaft 55. Shaft 51 has a face plate 56 integral therewith through which pass at two points shafts 57, on one end of each of which is fastened a gear 58 and at the other end a worm wheel 59. This constitutes the primary transmission element.

Worm wheel 59 is in mesh with worm 60 mounted on a shaft 61 running at right angles and through a projection 62 which is a part of shaft 51 and is journaled at each end in bearings 63 which are a part of face plate 56. When shaft 51 revolves it carries face plate 56, gear 58, worm wheel 59 and worm 60, as well as shaft 61 around with it. One of the worms 60 is of right hand thread, while the other is of left hand thread, from which it is evident that gears 58 are restrained against free rotation about their centers and being in mesh with gear 64 which is a part of driven shaft 55, the latter will be rotated at the same speed as the driving shaft 51. It will be noticed that shaft 61 is not restrained against longitudinal motion. This is for the purpose of taking up blacklash and bearing evenly on both gears, so as to insure that both gears 58 act upon the teeth of gears 64.

Shaft 61 is rotated by means of bevel pinion 65 through bevel gear 66 which is made integral with sleeve 67. Said sleeve is mounted on shaft 51 and allowed to rotate freely thereon.

Near its right end shaft 51 is formed integral with collar 68 to which is fastened by means of screws 69 bevel gear 70. This gear rotates together with shaft 51 and gives rotation to the two co-acting bevel pinions 71 each of which rotates in an opposite direction to the other on stud 72 held by a nut in the casing 52. Gears 71 have mounted on their hubs friction disks 73 arranged to rotate with the gears, but free to slide thereon and are forced out toward one another by means of springs 74 between disk 73 and pinions 71. On sleeve 67 is slidably mounted friction wheel 75 which is constrained to rotate therewith by means of suitable feathers. Dummy disk 76 is mounted at the other end of the friction disks merely to give them balance and stability. When shaft 51 is rotated, gears 70 and 71 as well as disks 73 are also rotated. The disks rotating in opposite direction act on both sides of friction wheel 75 causing the latter to rotate the sleeve 67 on which it is mounted and through that gear 65 and 66 as well as shaft 61 with its worms. The speed with which shaft 61 is rotated depends upon the position occupied by friction wheels 75. This friction wheel is arranged to be slid on sleeve 67 by groove 77, shift lever 78, shaft 79 and pedal 80.

It is understood that when friction wheel 75 occupies a position which rotates sleeve 67 at the same speed as shaft 51, no rotation will be imparted to shaft 61 and the driven shaft will run at the same speed as the driving shaft, should friction wheel 75 be slid along approximately into a position shown in Fig. 9, shaft 61 may be rotated fast enough to slow down the speed of shaft 55 to any desired amount, stop its rotating entirely or reverse its direction of rotation, as will be obvious from the above description of the preferred embodiment of my invention.

The many advantages of my improved transmission device will be apparent to those skilled in the art. The cumbersome gear shift and clutch now in common use, as well as the ordinary service brake are eliminated and there is substituted a single mechanism operated by a single controlling lever. In place of the three or four definite speed torque ratios of the ordinary transmission my improved transmission provides an infinite number which vary gradually in value from the maximum to the minimum both forward and reverse operation, so that exactly the correct ratio may be utilized for every load requirement. The automatic controller establishes the correct ratio for every load without any manipulation by the operator thus eliminating one of the most objectionable features of internal combustion engine vehicles. In fact, my invention possesses all of the desirable features both of the ordinary mechanical transmission and of the newer electrical transmission, while at the same time it eliminates the undesirable features of both.

While I have illustrated and described herein but two embodiments of my invention, it is to be understood that my invention is not in any way limited to the particular structure disclosed since obviously many changes therein may be made without departing from the scope of my invention.

What I claim is:

1. Means for transmitting power from a driving member to a driven member comprising a primary element driven by the driving member at a speed proportional thereto, a secondary element also driven by said driving member, including means effecting operative connection between the primary element and the driven member, automatic means for varying the operation of said secondary element under predetermined conditions thereby to vary the speed of the driven member relative to the driving member, and operator controlled means whereby the operation of said secondary element may be varied when desired.

2. Means for transmitting power from a driving member to a driven member comprising a primary element driven by the driving member at a speed proportional thereto, a secondary element also driven by said driving member, including means effecting operative connection between the primary element and the driven member, and means for varying the operation of said secondary element thereby to vary the speed of the driven member relatively to the driving member, said means including a member connected to said primary element, a rotary shaft mounted therein, gearing connecting said shaft and said secondary element, a normally stationary adjustable guideway and means including a follower adapted to travel in said guideway for effecting rotation of said shaft.

3. Means for transmitting power from a driving member to a driven member comprising a primary element driven by the driving member at a speed proportional thereto, a secondary element also driven by said driving member, including means effecting operative connection between the primary element and the driven member, and means for varying the operation of said secondary element thereby to vary the speed of the driven member relative to the driving member, said means including a member connected to said primary element, a rotary shaft mounted therein, gearing connecting said shaft and said secondary element, a normally stationary adjustable guideway and a crank arm connected at one end to said shaft through a unidirectional clutch, and provided at the other end with a follower adapted to travel in said guideway as said primary element rotates.

4. Means for transmitting power from a driving member to a driven member comprising a primary element driven by the driving member at a speed proportional thereto, a secondary element also driven by said driving member, including means effecting operative connection between the primary element and the driven member, and means for varying the operation of said secondary element thereby to vary the speed of the driven member relative to the driving member, said means including a member connected to said primary element, a plurality of rotary shafts mounted therein, gearing connecting said shafts to said secondary element and to each other, a normally stationary adjustable guideway and a crank arm connected at one end to each shaft through the unidirectional clutch, and provided at the other end with a follower adapted to travel in said guideway as said primary element rotates.

5. Means for transmitting power from a driving member to a driven member, comprising a gear connected to said driven member, a primary element driven by the driving member at a speed proportional thereto, a secondary gear in mesh with the first mentioned gear rotatably mounted in an eccentric position on said primary element and adapted to revolve therewith, a third gear concentric with the first mentioned gear for controlling the rotation of said second gear, and automatic means for driving said third gear from said primary element and for varying its speed relative thereto.

6. Means for transmitting power from a driving member to a driven member comprising a primary element driven by the driving member at a speed proportional thereto, a secondary element also driven by said driving member, including means effecting operative connection between the primary element and the driven member, means automatically controlled by the load on the driven member for varying the operation of said secondary element thereby to vary the speed of the driven member with respect to the driving member, and operator controlled means whereby the operation of said secondary element may be varied when desired.

7. Means for transmitting power from a driving member to a driven member, comprising a gear connected to said driven member, a primary element driven by the driving member at a speed proportional thereto, a second gear in mesh with the first mentioned gear rotatably mounted in an eccentric position on said primary element and adapted to revolve therewith, a third gear concentric with the first mentioned gear for controlling the rotation of said second gear, and means for driving said third gear from said primary element and for varying its speed relative thereto, and means automatically controlled by the load upon the driven member for varying the speed of said third gear relative to the speed of said primary element and thereby varying the speed of the driven member relative to the driving member.

8. Means for transmitting power from a driving member to a driven member comprising a primary element driven by the driving member at a speed proportional thereto, a secondary element also driven by said driving member, including means effecting operative connection between the primary element and the driven member, means for varying the operation of said secondary element thereby to vary the speed of the driven member relatively to the driving member, said means including a member connected to said primary element, a rotary shaft mounted therein, gearing connecting said shaft and said secondary element, a normally stationary adjustable guideway and means including a follower adapted to travel in said guideway for effecting rotation of said shaft, and means automatically controlled by the load upon the driven member for adjusting said guideway.

9. Means for transmitting power from a driving member to a driven member comprising a primary element driven by the driving member at a speed proportional thereto, a secondary element also driven by said driving member, including means effecting operative connection between the primary element and the driven member, and means for varying the operation of said secondary element thereby to vary the speed of the driven member relative to the driving member, said means including a member connected to said primary element, a plurality of rotary shafts mounted therein, gearing connecting said shafts to said secondary element and to each other, a normally stationary adjustable guideway, a crank arm connected at one end to each shaft through the unidirectional clutch, and provided at the other end with a follower adapted to travel in said guideway as said primary element rotates, and means automatically controlled by the load upon the driven member for adjusting said guideway.

10. Means for transmitting power from a driving member to a driven member, comprising a primary element driven by the driving member at a speed proportional thereto, a secondary element also driven by said driving member and including means effecting operative connection between the primary element and the driven member, a resilient connection between the driving member and the primary element whereby variations in the load upon the driven member will result in relative rotation between said driving member and said primary element, means controlled by said relative rotation for varying the operation of said secondary element and thereby varying the speed of the driven member with respect to the driving member, and operator controlled means whereby the operation of said secondary element may be varied gradually when desired.

11. Means for transmitting power from a driving member to a driven member comprising a primary element driven by the driving member at a speed proportional thereto, a secondary element also driven by said driving member, including means effecting operative connection between the primary element and the driven member, means for varying the operation of said secondary element thereby to vary the speed of the driven member relatively to the driving member, said means including a member connected to said primary element, a rotary shaft mounted therein, gearing connecting said shaft and said secondary element, a normally stationary adjustable guideway and means including a follower adapted to travel in said guideway for effecting rotation of said shaft, a resilient connection between the driving member and the primary element whereby variations in the load upon the driven member will result in relative rotation between said driving member and said primary element, and means controlled by said relative rotation for adjusting said guideway.

12. In a device of the class described, a driving member, a driven member, variable speed transmission means interposed therebetween and including a primary element driven by the driving member, a controller for said transmission means and means for automatically operating said controller, including a screw threaded member rotatable with said primary member but longitudinally movable thereon, a connection between said screw threaded member and said controller, a resilient connection between said driving member and said primary element, and a second screw threaded member connected to said driving member and engaged with the first mentioned screw threaded member.

13. Means for transmitting power from a driving member to a driven member comprising a primary element driven by the driving member at a speed proportional thereto, a secondary element also driven by said driving member, means for causing said secondary element to be driven at the same speed as the primary element, thereby to cause the driven member to be driven at said same speed, automatic means for increasing the speed of said secondary element relative to said primary element thereby to decrease the speed of the driven member relative to said primary element, and operator controlled means whereby the speed of said secondary element relative to said primary element may be varied when desired.

14. Means for transmitting power from a driving member to a driven member comprising a primary element driven by the driving member at a speed proportional thereto, a secondary element also driven by said driving member, including means effecting operative connection between the primary element and the driven member, and positive means for varying the operation of said secondary element thereby to vary the speed of the driven member relative to the driving member.

15. Means for transmitting power from a driving member to a driven member, comprising a gear connected to said driven member, a primary element driven by the driving member at a speed proportional thereto, a secondary gear in mesh with the first mentioned gear rotatably mounted in an eccentric position on said primary element and adapted to revolve therewith, a third gear concentric with the first mentioned gear for controlling the rotation of said second gear, and positive means for driving said third gear from said primary element and for varying its speed relative thereto.

16. Means for transmitting power from a driving member to a driven member comprising a primary element driven by the driving member at a speed proportional thereto, a secondary element also driven by said driving member, including means effecting operative connection between the primary element and the driven member, and positive means automatically controlled by the load on the driven member for varying the operation of said secondary element thereby to vary the speed of the driven member with respect to the driving member.

17. Means for transmitting power from a driving member to a driven member, comprising a primary element driven by the driving member at a speed proportional thereto, a secondary element also driven by said driving member and including means effecting operative connection between the primary element and the driven member, a resilient connection between the driving member and the primary element whereby variations in the load upon the driven member will result in relative rotation between said driving member and said primary element, and positive means controlled by said relative rotation for varying the operation of said secondary element and thereby varying the speed of the driven member with respect to the driving member.

18. Means for transmitting power from a driving member to a driven member comprising a primary element driven by the driving member at a speed proportional thereto, a secondary element also driven by said driving member, means for causing said secondary element to be driven at the same speed as the primary element, thereby to cause the driven member to be driven at said same speed, and positive means for increasing the speed of said secondary element relative to said primary element thereby to decrease the speed of the driven member relative to said primary element.

19. Means for transmitting power from a driving member to a driven member comprising a primary element driven by the driving member at a speed proportional thereto, a secondary element also driven by said driving member, means for causing said secondary element to be driven at the same rate of speed as the primary element, thereby to cause the driven member to be driven at said same speed, and positive means whereby the speed of said secondary element relative to said primary element may be increased to the point of bringing said driven member to a standstill, said driven member being held positively immovable in either direction when thus brought to a standstill.

20. Means for transmitting power from a driving member to a driven member comprising a primary element driven by the driving member at a speed proportional thereto, a secondary element also driven by said driving member, means for causing said secondary element to be driven at the same rate of speed as the primary element, thereby to cause the driven member to be driven at said same speed, and positive means whereby the speed of said secondary element relative to said primary element may be increased to the point of reversing the direction of rotation of said secondary element.

21. Means for transmitting power from a driving member to a driven member comprising a primary element driven by the driving member at a speed proportional thereto, a secondary element also driven by said driving member and including means effecting operative connection between the primary element and the driven element, a resilient connection between the driving member and the primary element whereby variations in the load upon the driven member will result in relative rotation between said driving member and said primary element, gearing controlled by said relative rotation for varying the operation of said secondary element and thereby varying the speed of the driven member with respect to the driving member, and operator controlled means whereby the operation of said secondary element may be varied gradually when desired.

ISIDOR TORNBERG.